US005196685A

United States Patent [19]
Izumi

[11] Patent Number: 5,196,685
[45] Date of Patent: Mar. 23, 1993

[54] BAR CODE READER

[75] Inventor: Masaki Izumi, Yokohama, Japan

[73] Assignee: Eastman Kodak Company, Rochester, N.Y.

[21] Appl. No.: 900,634

[22] Filed: Jun. 18, 1992

Related U.S. Application Data

[63] Continuation of Ser. No. 681,844, Apr. 8, 1991, abandoned.

[30] Foreign Application Priority Data

May 2, 1990 [JP] Japan .................................. 2-116656

[51] Int. Cl.$^5$ ............................................... G06K 7/10
[52] U.S. Cl. ...................................... 235/462; 235/463; 235/472
[58] Field of Search .......................... 235/462, 463, 472

[56] References Cited

U.S. PATENT DOCUMENTS

| | | | |
|---|---|---|---|
| 4,074,115 | 2/1978 | Sugiura et al. ................. | 235/462 X |
| 4,239,151 | 12/1980 | Enser et al. ..................... | 235/463 X |
| 4,902,883 | 2/1990 | Poland ............................ | 235/472 X |

Primary Examiner—Harold Pitts
Attorney, Agent, or Firm—Raymond L. Owens

[57] ABSTRACT

The present invention relates to a bar code reader for reading bar codes and converting them into resepective alphanumeric code signals. The bar code reader includes a scanner for scanning bar codes presented thereto, a timing pulse generating circuit, a sample and holding means, a pattern memory for storing matching bit patterns for a set of bar codes, and a pattern matching circuit. In operation, levels of a rectangular wave output signal generated by the scanner from scanning a bar code are successively read into the sample and holding means in response to predetermined sequence timing pulses provided by the time pulse generating means to store corresponding data bit pattern output signals. The pattern matching circuit compares the data bit pattern output signals from the sample and holding means with matching bit pattern signals stored in the pattern memory. From such pattern signal comparisions, the pattern matching circuit determines which of the matching bit pattern signals is the most likely to be the bar code in question. The pattern matching circuit then converts the determined most similar matching bit pattern signals into the alphanumeric code signal and outputs it.

20 Claims, 2 Drawing Sheets

BAR CODE READER

CROSS-REFERENCE TO RELATED APPLICATION

This application is a continuation of U.S. patent application No. 681,844 filed Apr. 8, 1991 now abandoned, entitled "Bar Code Reader" by M. Izumi.

FIELD OF THE INVENTION

The present invention relates to a bar code reader for reading a bar code recorded on a surface and decoding the bar code into a numeric or character signal associated therewith.

BACKGROUND OF THE INVENTION

In general, a bar code is formed with combined bars and spaces according to an appropriate rule to designate a predetermined numeric or character. Such bar codes are widely used as input means for computers because such bar code input means are cheaper and relatively highly reliable when compared with other ordinary input means.

Referring now to FIG. 1, there is shown a conventional bar code reader 10 including a scanner 11, a time measuring circuit 12, a comparator circuit 13, a data latching circuit 14 (shown within a dashed line rectangle), and a decoder 15. The scanner 11 is used to read a bar code placed in its view, and then to convert light and dark areas of the bar code into a representative high and low level, respectively, output electrical signal. The time measuring circuit 12 measures the duration of the time period of each of the high and low levels of the output electrical signal from the scanner 11, and generates an output timing signal $t_i$ representative of the length of each of the time periods. The time measuring circuit 12 also provides output timing signals to the data latching circuit 14 and to the decoder 15. The comparator circuit 13 compares each timing signal $t_i$ ($i=1, 2, 3, \ldots$) from the time measuring circuit 12 with a predetermined reference time period signal $t_{TH}$. As a result of such comparison, the comparator circuit 13 generates a high level electrical output data signal only when the time signal $t_i$ is higher than the predetermined reference time period signal $t_{TH}$, and generates a low level electrical output data signal when the time period signal $t_i$ is less than the predetermined reference time period signal $t_{TH}$. The data latching circuit 14 latches (captures) the output data signals from the comparator circuit 13 in response to clock (timing) signals from the time measuring circuit 12. More particularly, the data latching circuit 14 is shown as including seven serially-connected registers 16 for sequentially shifting and storing the output data signals from the comparator circuit 13 through the serial registers 16. The decoder 15 decodes each output data signal from the data latching circuit 14 and generates a representative bar code reader 10 alphanumeric output signal.

Referring now to FIGS. 2 and 3, there are shown the sequence of operation for the bar code reader 10 of FIG. 1 for a particular bar code with and without, respectively, the presence of a noise component. In FIG. 2, at line (a), there is shown a typical bar code (NW-7) commonly used to designate the character numeric "1". This bar code is read by scanner 11 and quantized (or binary coded) to generate a rectangular wave output signal as shown in FIG. 2 at line (b). The time measuring circuit 12 is always reset at a time of change over from a high level to a low level, and vice versa, in the rectangular wave output signal. More particularly, the time measuring circuit 12 measures the duration (period) of time for each of the high and low levels of the rectangular wave output signal, and generates the representative time period output signal $t_1, t_2, \ldots, t_7$, indicated in FIG. 2 at line (c) for each of the measured time periods.

Each of the representative time period output signals is then compared by the comparator circuit 13 with a predetermined reference time period signal $t_{TH}$. The comparator circuit 13 generates a logic level "1" as an output signal when any one of the high or low level representative time period output signals $t_i$ is larger than the predetermined reference time period signal $t_{TH}$, and generates a logic level "0" when any one of the high or low level representative time period output signals $t_i$ is smaller than the predetermined reference time period signal $t_{TH}$. The resultant data output signals from comparator 13 for the bar code of FIG. 2, line (a) is "0000110" (as shown in FIG. 2, line (d)) which becomes latched (stored) in the latching circuit 14.

The decoder 15 includes a code look-up table (not shown) comprising a Read Only Memory (ROM) which is used to store a predetermined code pattern and alphanumeric for each of the separate bar codes. With reference to the arrangement of the "0's" and "1's" in the "0000110" data output signals from the latching circuit 14, a decision is made by decoder 15, from accessing its look-up table, that the data output signals designate the alphanumeric "1". The decoder 15 then converts the alphanumeric "1" to, for example, a corresponding ASCII code and generates a decoded output signal as shown in FIG. 2, line (e).

In the conventional bar code reader 10, the bar code may include a noise component due to contamination or the like. FIG. 3, line (a) shows the typical bar code (NW-7) used to designate character number "1", but it includes a noise component which is shown as a diagonal region. The rectangular wave output signal from the scanner 11 is as shown in FIG. 3, line (b). It is to be understood that noise components can be caused by signatures, stamps and marks which overlap the bar code. The time measuring circuit 12 and comparator circuit 13 then produces the resultant data output signals of "0000100" as shown in FIG. 3, line (d) which is latched in latching circuit 14. The next to last binary 0 is shown with a double underscore to indicate that it is different (incorrect) from the last binary 1 shown in FIG. 2, line (d). Decoder 15 receives these resultant data output signals from latching circuit 14 and finds that there is no code corresponding to the bit pattern "0000100" in its look-up table. Therefore, the decoding operation cannot be performed in the decoder 15, and the decoder 15 generates either a questionable "?" or no bar code reader 10 output signal. Depending on the degree of contamination, the resultant data output signals from the latching circuit 14 may be recognized as a different alphanumeric, and thereby be converted into a different ASCII code.

Furthermore, if a noise component (as a blot) is attached to the bar code read by the scanner 11, the output signals from the scanner 11 may constitute a phenomenon similar to that of an additional or excessive bar that is inserted into a space in the bar code. As a result, a bar code that is read subsequent to the bar code shown in FIG. 2, line (a) will be recognized as including part of the preceding latched bar code of FIG. 3, line (b). Thus, the subsequent bar code will also not be recognized correctly because it has been incorrectly decoded.

From the above, it can be seen that the quality of recognition of the bar codes is lowered in the conventional bar code reader 10 when a noise component is attached to the bar code being read. Therefore, the conventional bar code reader 10 cannot cope with a noise component generated while reading a bar code caused by contamination or the like.

SUMMARY OF THE INVENTION

The present invention is directed to method and apparatus for a bar code reader for reading bar codes recorded on a surface, and for optionally converting the bar codes into respective alphanumeric code signals corresponding thereto.

In a first embodiment of the invention, the bar code reader comprises scanning means, sampling and holding means, memory means and pattern matching means. The scanning means scans a bar code presented to the scanning means and quantizes the scanned bar code to generate a representative rectangular wave output signal. The scanning and holding means samples the representative rectangular wave output signal from the scanning means at predetermined time intervals, and holds the sample values for a predetermined duration of time to provide corresponding data bit pattern output signals. The memory means stores separate matching bit pattern signals and an alphanumeric code signal for each of the bar codes to be read by the scanning means. The pattern matching means compares bits of the data bit pattern output signals from the sampling and holding means with corresponding bits of each of the matching bit pattern signals stored in the memory means for determining which one of the matching bit pattern signals most likely corresponds to the bar code read by the scanning means.

In another embodiment of the invention, the bar code reader comprises scanning means, sampling and holding means, memory means and pattern matching means. The scanning means scans a bar code presented to the scanning means and then quantizes the scanned bar code to provide representative data output signals. The sampling and holding means captures the data output signals from the scanning means and generates corresponding data bit pattern output signals. The memory means stores matching bit pattern signals corresponding to the each of the respective bar codes to be read by the scanning means. The pattern matching means compares the data bit pattern output signals from the sampling and holding means with at least a portion of the matching bit pattern signals stored in the memory means for determining an identified matching bit pattern and an alphanumeric code signal corresponding to the bar code read by the scanning means.

Still another embodiment is directed to a method for reading bar codes recorded on a surface comprising the following steps. Initially, a bar code is scanned, and the scanned bar code is quantized for generating a representative rectangular wave output signal. The representative rectangular wave output signal is sampled at predetermined time intervals, and the sample values are held for a predetermined time period to provide corresponding data bit pattern output signals. Separate matching bit pattern signals and an alphanumeric code signal are stored for each of the bar codes to be read by the scanning means in a memory means. Finally, bits of the data bit pattern output signals associated with the detected bar code are compared with corresponding bits of each of the matching bit pattern signals stored in the memory means for determining which one of the matching bit pattern signals most likely corresponds to the bar code read by the scanning means.

The invention will be better understood from the following more detailed description taken with the accompanying drawings and claims.

The drawings are not necessarily to scale.

DETAILED DESCRIPTION

Figure 2:
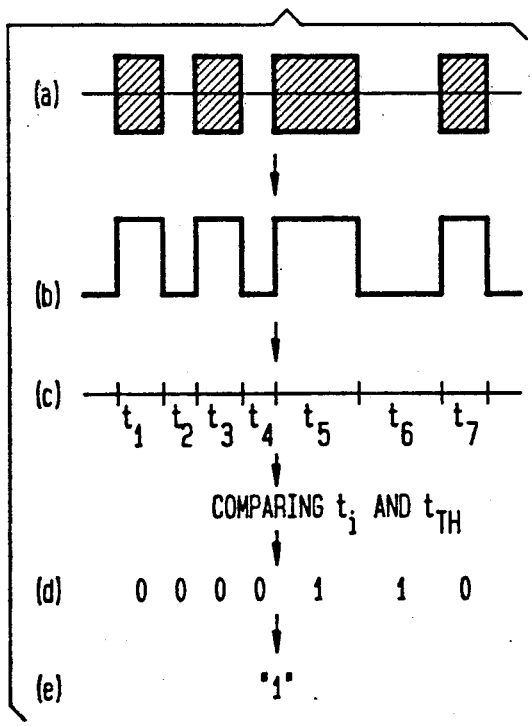
FIG. 2 illustrates the sequence of operation in lines (a), (b), (c), (d) and (e) of the conventional bar code reader of FIG. 1 where no noise component is present in the read bar code.
Figure 4:
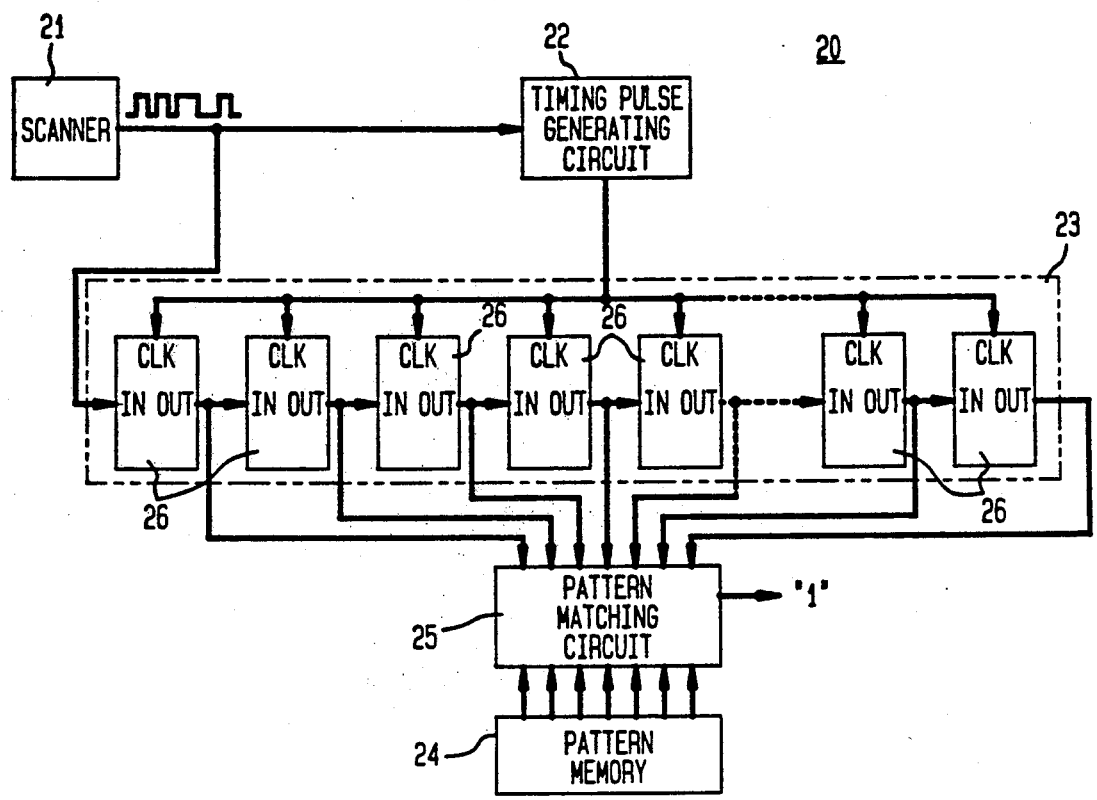
FIG. 4 is a block diagram of a bar code reader in accordance with the present invention.

Referring now to FIG. 4, there is shown a block diagram of a bar code reader 20 in accordance with the present invention. Bar code reader 20 comprises a scanner 21, a timing pulse generating circuit 22, a data latching circuit 23 (shown within a dashed line rectangle), a pattern memory 24, and a pattern matching circuit 25. Scanner 21 can comprise any suitable circuit such as a laser scanner, a CCD array sensor, etc., capable of performing the scanning operation of bar codes at a constant speed to generate representative rectangular wave output signals. The signal output for scanner 21 is representative of the scanning of a bar code Numeric "1" which contains no noise component and is the same as is shown in FIG. 2, line (b). Timing pulse generating circuit 22 receives the rectangular wave output signals from the scanner 21 and generates timing pulses of a predetermined cycle to the data latching circuit 23. The data latching circuit 23 (or a shift register), which comprises a predetermined number of flip-flops 26, is used to latch the levels of the rectangular wave output signal from the scanner 11, using the predetermined timing pulses from the timing pulse generating circuit 22 as reading clock pulses. The number of flip-flops 26 forming the data latching circuit 13 is the same number as that of the bits forming each pattern stored in the pattern memory 24. The number of flip-flops 26 is also selected so that the signal for an alphanumeric from the scanner 21 can be latched in the latching circuit 23 by the reading clock pulses (the timing pulses) from the timing pulse generating circuit 22.

Figure 5:
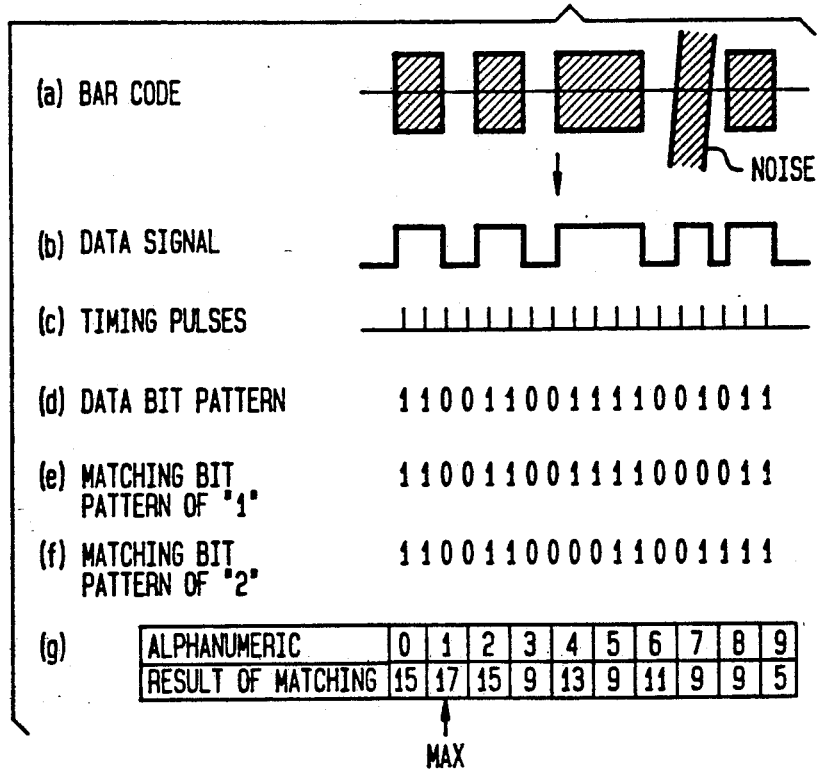
FIG. 5 illustrates the sequence of operation in lines (a), (b), (c), (d), (e), (f) and (g) of the bar code reader of FIG. 4.

Referring now to FIG. 5, there is shown the sequence of operation for the bar code reader 20 of FIG. 4 for a particular bar code with the presence of a noise component. More particularly, a bar code which has overlaid a noise component as shown in FIG. 5, line (a) [similar to that shown in FIG. 3, line (a)]. The bar code is scanned by scanner 21 at a constant speed and is formed, or quantized, into a rectangular wave output signal from the scanner 21 as shown in FIG. 5, line (b), which is similar to the signal of FIG. 3, line (b). The timing pulse generating circuit 22 generates timing pulses of a predetermined cycle as shown in FIG. 5 at line (c). Every time such a timing pulse is outputted to the data latching circuit 23, the level of the rectangular wave output signal from the scanner 21 is read into the first flip-flop 26 of the data latching circuit 23. At the end of the rectangular wave output signal from the scanner 21, the data latching circuit has latched the data "110011001111001011" as shown in FIG. 5 at line (d). Thus, the timing pulse generating circuit 22 and the data latching circuit 23 constitute a sampling and holding means for sampling the data from the scanner 21 at a predetermined sampling cycle and holding (latching) the respective sample data.

In the pattern memory 24, separate matching bit patterns corresponding to each of the separate bar codes representing the respective alphanumerics are stored in a table (not shown). For example, the alphanumerics "1" and "2" are referred to as "110011001111000011" and "110011000011001111", respectively, as shown in the respective lines (e) and (f) of FIG. 5, and are stored in separate locations of the table in the pattern memory 24. These matching bit patterns are successively read out from the pattern memory 24 and provided to the pattern matching circuit 25. In the pattern matching circuit 25, each bit of the data bit pattern (FIG. 5, line (d)) output from the latching circuit 23 is compared with the corresponding bit of each of the matching bit patterns read out from the pattern memory 24 and the number of matching "0's" and "1's" bits are counted. Additionally, the maximum number of matching bits is detected for each matching bit pattern. If the maximum number of matching bits for a matching bit pattern is found to be larger than a predetermined value, the matching bit pattern relating to that maximum number is determined to correspond to the bar code.

In FIG. 5, line (g), there is shown a table of exemplary numbers of coincident bits between the data bit pattern of FIG. 5 line (d) from the data latching circuit 23, and the result of matching between each of the respective matching bit patterns for the alphanumerics 0 to 9 stored in the pattern memory 24. Since the pattern matching circuit 25 detects that the alphanumeric "1" has the maximum number of coincident bits [illustrated as a number 17 in the result of matching portion of FIG. 5, line (g)], a decision is made that the alphanumeric "1" corresponds to the bar code scanned by scanner 21. As a result the pattern matching circuit 25 generates an ASCII code corresponding to the alphanumeric "1" as the decoded output from bar code reader 20.

Figure 1:
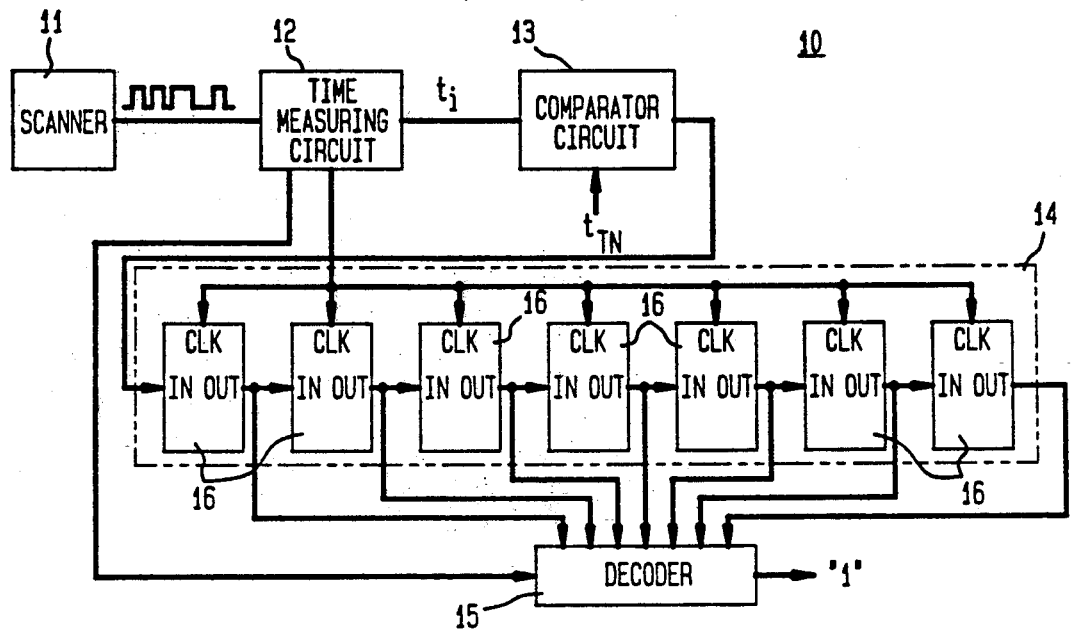
FIG. 1 is a block diagram showing a conventional (prior art) bar code reader.
Figure 3:
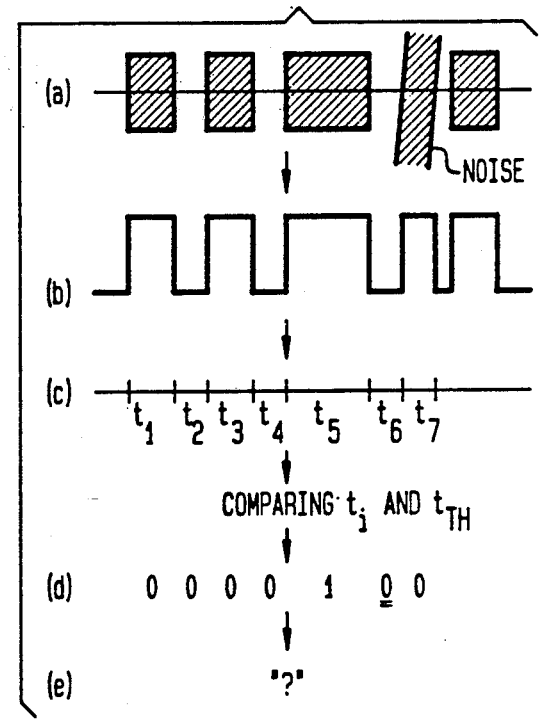
FIG. 3 illustrates the sequence of operation in lines (a) to (e) of the bar code reader of FIG. 1 where a noise component is introduced in a space of the read bar code.

As described relative to FIGS. 1, 2 and 3, the conventional bar code reader 10 has disadvantages in that it reads and identifies a bar code only by paying attention to boundary points between the bars and spaces, or the varying points of the logic levels of the electric signals from the scanner 11. Thus, a noise component caused by contamination, or the like, may be recognized as a bar, thereby lowering the rate (accuracy) of bar code recognition. However, with the bar code reader 20 of the present invention, even when the bar code includes a noise component, the alphanumeric corresponding to the bar code is correctly recognized to provide an enhanced rate of recognition of the bar code compared to the conventional bar code reader 10.

It is to be appreciated and understood that the specific embodiments of the invention are merely illustrative of the general principles of the invention. Various modifications may be made consistent with the principles set forth. For example, for a different sized set of bar codes, the decoding of such set of bar codes can be made using the circuit arrangement of FIG. 4 provided the sampling cycle (shown in FIG. 5, line (c)) is appropriately adjusted. Since an ordinary bar code includes a start code comprising a specific code at its starting end, it is possible only to perform a pattern matching operation for the start code until the start code is initially detected, while matching with other code bit patterns is omitted. Further, since the length of a bar code is ordinarily constant, once the start code has been detected, the data can be shifted by a sampling clock into the latching circuit 23 without effecting bit pattern matching until it is expected that all the sampled data output signals of a bar code have been latched into the latching circuit 23.

In FIG. 5, the timing pulse for the sampling operation in the above-described embodiment is shown at line (c) as having a constant cycle. It is to be understood that since the bar-to-space format ratio in bar codes is generally approximately 2.2 to 3 times in range, the sampling operation can be performed at uneven intervals so that a substantial sampling can be made at the center portion of each of the bars and spaces to accommodate the variation in format ratio.

Taking into consideration the enhancement of recognition of the alphanumerics and the reliability of the present inventive bar code reader 20 of FIG. 4, it is possible to use a check digit to resolve the case where the number of the matching bit patterns are the same for different matching bit patterns and the data output signal pattern from the latching circuit 23 as a result of the matching operation.

What is claimed is:

1. A bar code reader for reading bar codes recorded on a surface and converting the bar codes into respective alphanumeric code signals corresponding thereto comprising:

scanning means for scanning and quantizing the bar codes to generate a respective rectangular wave output signal;

sampling and holding means for sampling the rectangular wave output signal from the scanning means at predetermined sequential time periods, and for holding the samples for providing corresponding data bit pattern output signals;

memory means for storing matching bit pattern signals corresponding to the respective bar codes to be read; and pattern matching means for comparing the data bit pattern output signals from the sampling and holding means with the matching bit pattern signals stored in the memory means for determining an identified data bit pattern output signal corresponding to the read bar code indicated in the most likely matching bit pattern signals and for generating a representative alphanumeric code output signal.

2. The bar code reader of claim 1 wherein the pattern matching means comprises means for detecting a number of bits in each of the matching bit pattern signals which have levels that are coincident with corresponding bits of the data bit pattern output signals from the sampling and holding means and determining the maximum number in the detected number of bits, whereby the matching bit pattern signals having the maximum number of bits is determined as the most likely matching bit pattern signals.

3. The bar code reader of claim 2 wherein the pattern matching means further includes means for converting the determined most likely matching bit pattern signals into the alphanumeric code output signal.

4. A bar code reader for reading bar codes recorded on a surface comprising:
   scanning means for scanning a bar code presented to the scanning means and quantizing the scanned bar code to generate a representative rectangular wave output signal;
   means for sampling the representative rectangular wave output signal from the scanning means at predetermined time intervals, and for holding the sample values for a predetermined time period to provide corresponding data bit pattern output signals;
   memory means for storing separate matching bit pattern signals and an alphanumeric code signal for each of the bar codes to be read by the scanning means; and
   pattern matching means for comparing bits of the data bit pattern output signals from the sampling and holding means with corresponding bits of each of the matching bit pattern signals stored in the memory means for determining which one of the matching bit pattern signals most likely corresponds to the bar code read by the scanning means.

5. The bar code reader of claim 4 wherein the representative rectangular wave output signal from the scanning means is a binarized signal.

6. The bar code reader of claim 4 wherein each of the sample values being held in the sampling and holding means comprises either a high or a low level value corresponding to the level value of the rectangular wave output signal during the time of a sampling for forming bits of the data bit pattern output signals.

7. The bar code reader of claim 4 wherein the pattern matching means comprises:
   means for detecting a number of bits in each of the matching bit pattern signals which have levels that are coincident with corresponding bits of the data bit pattern output signals from the sampling and holding means; and
   means for determining the maximum number of coincident levels in the detected number of corresponding bits, whereby the matching bit pattern signals having the maximum number of bits is determined as the most likely matching bit pattern signals.

8. The bar code reader of claim 7 wherein the pattern matching means further includes means for converting the determined most likely matching bit pattern signals into an alphanumeric code output signal.

9. The bar code reader of claim 4 further comprising timing pulse generating means responsive to the rectangular wave output signal from the scanning means for generating timing pulses at the predetermined time intervals for transmission to the sampling and holding means.

10. The bar code reader of claim 9 wherein the timing pulses have a constant interval between pulses.

11. The bar code reader of claim 9 wherein the timing pulses are generated at uneven intervals whereby sampling by the sampling and holding means is performed at least in a central portion of each of a bar and a space of the bar code being scanned to accommodate a variation in a bar-to-space format ratio of the bar code.

12. The bar code reader of claim 9 wherein the timing pulses have intervals for providing at least two timing pulses during each of a bar and a space of the bar code scanned by the scanning means.

13. A method for reading bar codes recorded on a surface comprising the steps of:
   (a) scanning a bar code and quantizing the scanned bar code for generating a representative rectangular wave output signal;
   (b) sampling the representative rectangular wave output signal at predetermined time intervals, and holding the sample values for a predetermined time period for providing corresponding data bit pattern output signals;
   (c) storing separate matching bit pattern signals and an alphanumeric code signal for each of the bar codes to be read by the scanning means in a memory means; and
   (d) comparing bits of the data bit pattern output signals associated with the detected bar code with corresponding bits of each of the matching bit pattern signals stored in the memory means for determining which one of the matching bit pattern signals most likely corresponds to the bar code read by the scanning means.

14. The method of claim 13 wherein in step (a) the representative rectangular wave output signal is a binarized signal.

15. The method of claim 13 wherein in step (b) each of the sample values comprises either a high or a low level value corresponding to the level value of the rectangular wave output signal during the time of a sampling for forming bits of the data bit pattern signals.

16. The method of claim 13 wherein step (d) comprises the substeps of:
   (d1) detecting a number of bits in each of the matching bit pattern signals which have levels that are coincident with corresponding bits of the data bit pattern output signals; and
   (d2) determining the maximum number of coincident levels in the detected number of corresponding bits, whereby the matching bit pattern signals having the maximum number of bits is determined as the most likely matching bit pattern signals.

17. The method of claim 16 wherein step (d) further includes the step of:
   (d3) converting the determined most likely matching bit pattern signals into an alphanumeric code output signal.

18. The method of claim 13 wherein prior to step (b) performing the step of:
   (e) generating timing pulses at the predetermined time intervals for use in sampling the representative rectangular wave output signal at predetermined time intervals.

19. The method of claim 18 wherein the timing pulses have a constant interval between pulses.

20. The method of claim 18 wherein the timing pulses have uneven intervals whereby sampling is performed at least in a central portion of each of a bar and a space of the bar code being scanned to accommodate a variation in a bar-to-space format ratio of the bar code.

* * * * *